J. BALL.

Improvement in Shutter Workers and Fasteners.

No. 123,664. Patented Feb. 13, 1872.

Witnesses.
Edw. F. Brown
Jno. Williams

Jonathan Ball
Inventor
By his Atty. J. F. Reigart

UNITED STATES PATENT OFFICE.

JONATHAN BALL, OF WILMINGTON, DELAWARE.

IMPROVEMENT IN SHUTTER-WORKERS AND FASTENERS.

Specification forming part of Letters Patent No. 123,664, dated February 13, 1872.

*To all whom it may concern:*

Be it known that I, JONATHAN BALL, of Wilmington city, New Castle county, State of Delaware, have invented an Improved Shutter-Fastener; and I do hereby declare the following to be an exact description thereof, reference being had to the acccompanying drawing and to the letters of reference marked thereon making a part of this specification, in which—

Figure 1:
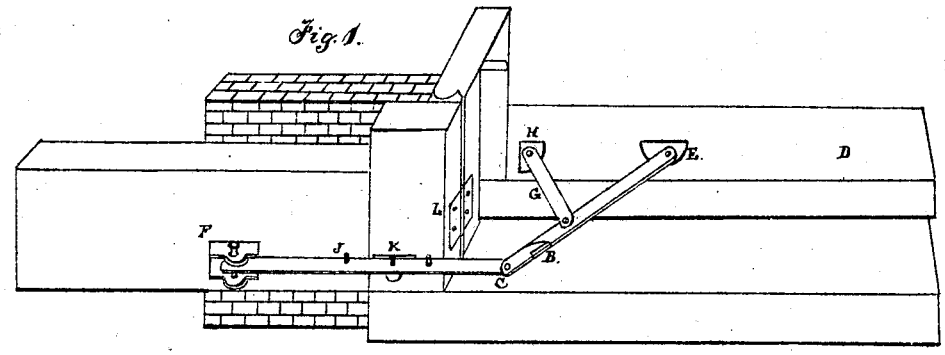
Figure 2:
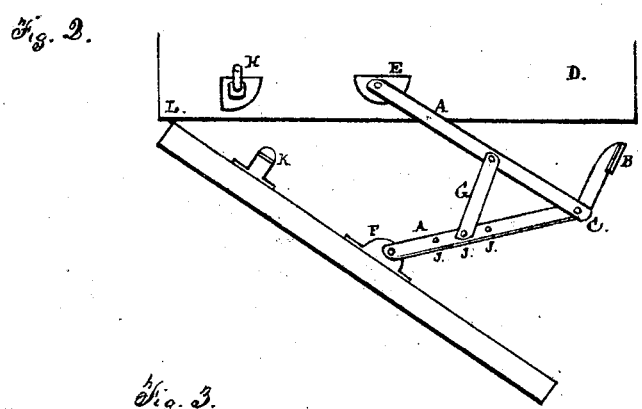
Figure 3:
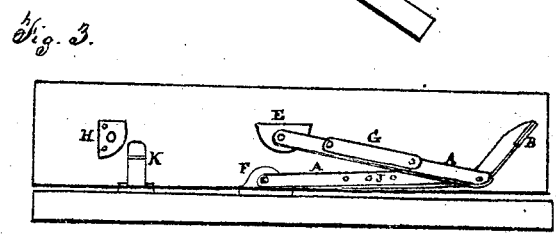

Figure 1 represents a perspective view of the fastener as attached to the window sill and shutter. Fig. 2 shows the position of the fastener holding the shutter when bowed. Fig. 3 shows the position of the fastener when the shutter is closed.

The nature of my invention consists in the peculiar construction of the fastener in combination with its joint, the tie-bar, catch, swivel-plate, and hinge, arranged and operating as herein described and set forth in the claims.

A is the horizontal-jointed lever, with a stop, B, at the joint C near the center of the lever, with the two extreme ends of the lever, one attached permanently to the sill D of the window by a swivel-plate or hinge, E, and the opposite end attached to the shutter by a hinge, F. Said hinge F and swivel-plate E are made of the proper form to keep the lever A in its proper horizontal position while the shutter is being opened or shut, and when the shutter is open to hold it in its proper position; and when the shutter is closed the lever closes itself up between the shutter and window-sash, as shown at Fig. 3. The tie-bar G holds the lever permanently when the shutter is open by being attached to the pin H on the sill; and when the window is required to be bowed the same tie-bar is used to hold the shutter at any angle by being connected with the stud-pins J J on the lever. The catch K also locks the lever A when the shutter is open; and the stop B is intended to be used to strengthen the joint C in case the butt L of the shutter is weak. But when the butt on the shutter is a strong one I may not use the stop or catch, just as I deem necessary. To close the shutter the jointed lever is taken hold of at the joint C and the tie-bar G is raised off of its pin H and the lever is slightly raised out of the catch K, and the shutter is then easily drawn to, and closed as usual.

What I claim as my invention, and desire to secure by Letters Patent, is—

1. The combination of the horizontal jointed-lever A A, provided with a stop, B, elbows and stay-pins, and pivoted to the shutter and sill, respectively, with the tie-piece or cross-bar G, adjustable on the stay-pins J J J, all substantially as described, and for the purpose set forth.

2. In combination with the elements of the above, the pin H, to hold the cross-bar as a brace when the shutter is wide open, all as parts of a shutter-worker and fastening, as herein described and shown.

JONATHAN BALL.

Witnesses:
J. FRANKLIN REIGART,
EDM. F. BROWN.